United States Patent [19]

Qualline et al.

[11] Patent Number: 4,955,166
[45] Date of Patent: Sep. 11, 1990

[54] TORNADO UNDERGROUND SHELTER

[76] Inventors: Steve M. Qualline, P.O. Box 1812, Odessa, Tex. 79760; Louis R. Dunnam, 1209 W. Cuthbert, Midland, Tex. 79701

[21] Appl. No.: 271,530

[22] Filed: Nov. 15, 1988

[51] Int. Cl.$^5$ ............................................. E02D 27/00
[52] U.S. Cl. .................... 52/169.6; 52/169.5; 109/15
[58] Field of Search ............................ 52/169.6, 169.5; 109/1 R, 1 S, 1 V

[56] References Cited

U.S. PATENT DOCUMENTS

| | | | |
|---|---|---|---|
| 795,984 | 8/1905 | Julian | 52/169.5 X |
| 2,968,130 | 1/1961 | Bascom | 109/1.5 X |
| 3,049,835 | 8/1962 | Sundstrum | 52/169.6 |
| 3,159,117 | 12/1964 | Rosenfeld | 52/169.6 X |
| 3,212,220 | 10/1965 | Boniecki et al. | 109/1.5 X |
| 3,974,599 | 8/1976 | Grosh | 52/169.6 X |
| 4,539,780 | 9/1985 | Rice | 52/169.6 |
| 4,642,952 | 2/1987 | Prandin | 52/169.6 |
| 4,660,334 | 4/1987 | McCarthy | 52/169.6 |

Primary Examiner—David A. Scherbel
Assistant Examiner—Creighton Smith
Attorney, Agent, or Firm—Marcus L. Bates

[57] ABSTRACT

A generally spherical tornado shelter for safely housing and protecting people and things underground in the form of a truncated globe that is formed from a curved sidewall and terminates in a floor at the lower end thereof. A seat member is attached to the sidewall and to the floor and thereby forms a structural member that regidifies the globe. A generally rectangular entrance is formed in spaced relation to the central axis and provides a doorway into the interior of the structure. A plurality of steps lead from the entrance down to the floor and enables people to conveniently walk through the entrance, down the steps, into and back up from the shelter.

13 Claims, 4 Drawing Sheets

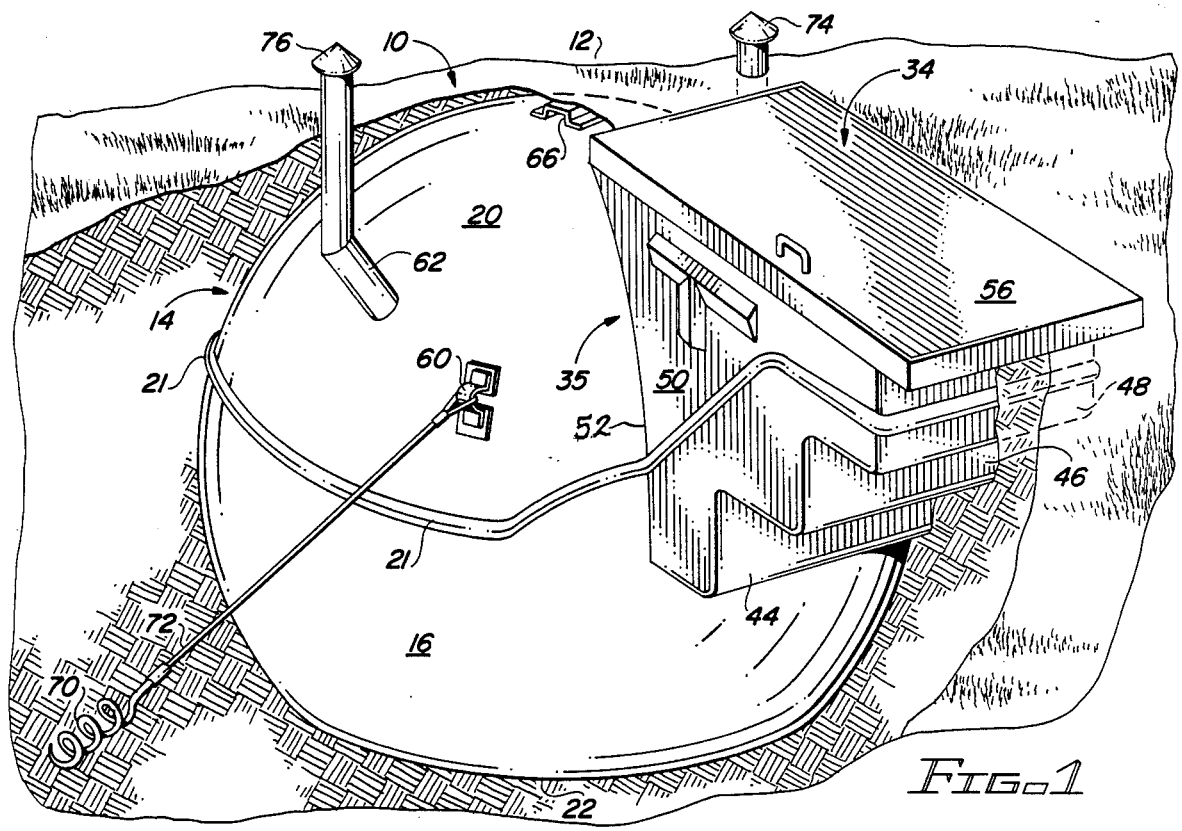

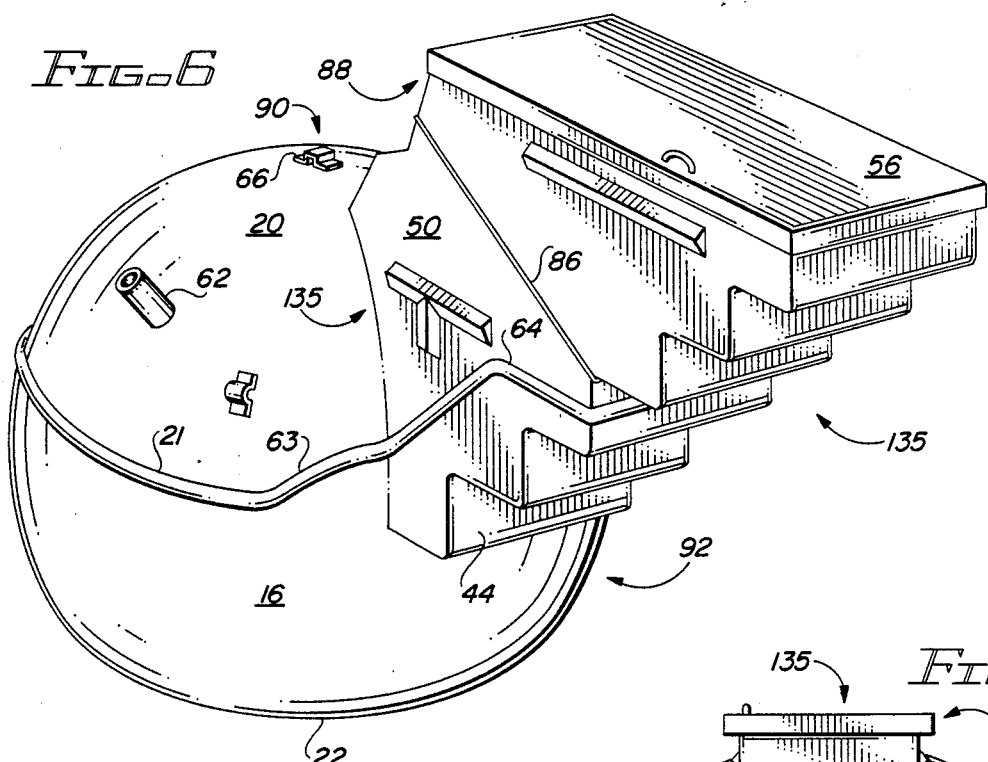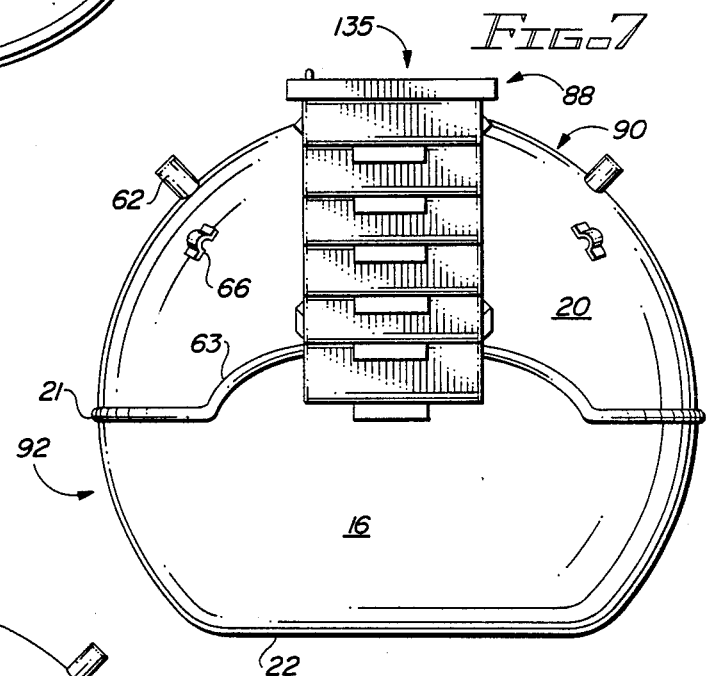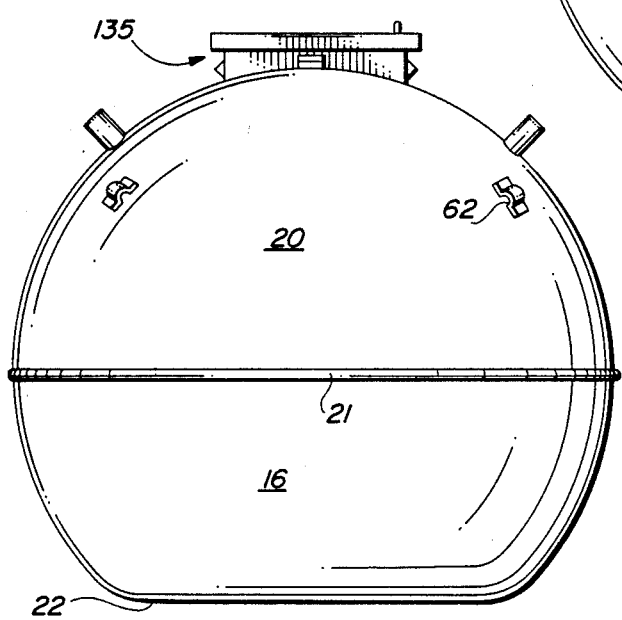

TORNADO UNDERGROUND SHELTER

BACKGROUND OF THE DISCLOSURE

Underground shelters for the protection of people and of things from hurricanes and tornados are known to those skilled in the art as evidenced by the following Patents:

| | | |
|---|---|---|
| Design 241,737 | 2,968,130 | 3,974,599 |
| Design 242,446 | 3,049,835 | 4,642,952 |
| Design 261,432 | 3,159,117 | 4,660,334 |
| | 3,212,220 | |

In many parts of the United States, an underground shelter is considered impractical because the water table sometimes rises near the surface of the ground, and consequently the shelter becomes saturated with moisture although the shelter may be only 7-12 feet in height and therefore buried not very deep below the surface. Heretofore, others have attempted to provide a prefabricated shelter which can be directly buried in soil saturated with water, and invariably the shelter will eventually deteriorate sufficiently to break or crack and admit moisture thereinto. This is especially so of concrete shelters that inherently shrink over a projected time period and ultimately crack. Furthermore, it is difficult to prevent a thin membrane concrete structure from becoming saturated with the surrounding moisture and thereby raising the humidity within the structure to a value that renders the interior unsuitable for use as a habitation. It is therefore difficult to provide a ready-made underground shelter of the foregoing type having an environment that is always ready to accept persons and things, and wherein things can be stored until needed without degradation due to moisture.

Another important consideration of an underground shelter is the probability of intrusion of water to the extent that the shelter is floated from its underground location towards the surface of the ground where it can be swept away by tornadic winds.

Underground shelters are difficult to build insitu. This is especially so for a spherical, thin membrane, fiberglass structure. On the other hand, fabricating a spherical structure at a manufacturing facility and then transporting the structure to its burial site requires that the shelter be of great structural integrity so that it can be lifted onto a transport, endure the travel, and subsequently again be lifted and deposited within an excavation or hole. Further, the physical size of the shelter must be within the limits set by the law in order for a vehicle to legally transport the shelter along public roads without interference from the bureaucracy.

Heretofore, fiberglass tornado shelters of unitary construction have been suggested; however, the provision of a unitary fiberglass tornado shelter that overcomes all of the above drawbacks and which endures for a reasonable number of years is yet to be achieved until the present invention.

Accordingly, the subject of the present invention is the provision of a novel prefabricated tornado shelter for safely housing and protecting people and things underground, and provides a safe enclosure which is rigidified and built in a unique manner, and which can be anchored to the surrounding subsoil in a new and unobvious manner.

SUMMARY OF THE INVENTION

A generally spherical tornado shelter for safely housing and protecting people and things in anchored relationship underground is provided by the present invention. The shelter is in the form of a truncated globe formed from a curved sidewall and includes a vertical central axis that passes through a top and bottom surface. An equatorial plane passes through the major diameter of the globe at right angles to the central axis. The truncation of the globe forms the bottom surface which is flat and lies in a plane spaced from and parallel to the equatorial plane and forms the floor.

Within the shelter is a seat made integral therewith and circumferentially extending about the interior of the shelter. The seat is attached to the sidewall and to the floor, thereby forming an annular structural member that rigidifies the structure. The seat location provides an unexpected comfortable back rest, and inherently causes the inhabitants to stand erect on the floor at a location that provides ample headroom.

An entrance is formed into the shelter from an upstanding generally rectangular passageway arranged eccentrically respective to the central axis. The passageway is spaced from and extends radially from the central axis, and downwardly through the sidewall at a location commencing above the top. A lower edge of the rectangular passageway extends circumferentially along the outer curved sidewall radially toward the bottom and terminates in close proximity to a mating edge that is spaced from and extends from the equatorial plane. A closure member forms a door for said entrance, and a plurality of steps leads from the entrance down to the floor. This enables a person to conveniently walk through the entrance, down the steps, where the person can either stand or be seated on the seat. The seat is structurally integrated with some of the steps leading to the floor. Vent means attached to the top surface communicates the interior of the shelter with ambient.

The entrance is rectangular and includes vertical wall members having opposed sides that terminate in opposed edges, there being an inner and an outer edge. The inner edge is curved into attached relationship respective to the curved sidewall while the outer edge is spaced from said curved sidewall and abuttingly engages said door.

These desirable attributes have a synergistic effect that results in less claustrophobia, the illusion of a greater living area than actually is available, and a sense of well being not usually associated with underground structures.

Anchor attachment points are rigidly attached to the outside surface of the shelter in radially spaced relationship respective to one another and to the central axis. Attached to the attachment points are tension members connected to anchor means buried in the subsoil by which the entire shelter structure is anchored into the earth with great force.

Accordingly, a primary object of the present invention is the provision of an underground shelter of spherical configuration having an annular structural member contained therewithin that serves to rigidify the structure, form a circular seat, and form a support for steps leading into the structure.

Another object of this invention is the provision of a system of anchoring a fiberglass shelter underground so that the shelter is not liable to be floated to the surface nor disturbed by tornadic winds.

A further object of the present invention is the provision of an underground shelter having a novel entrance formed thereinto that greatly enhances the utility of the structure.

An additional object of this invention is the provision of a new and novel method of assembling a shelter from subassemblies so that a unitized shelter impervious to underground water is realized.

A still further object of this invention is to provide an underground shelter of great structural integrity that can be fabricated at a manufacturing facility and transported along public roads to a burial site.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 1 is an isolated cross-sectional view of the earth showing a perspective view of an underground shelter made in accordance with the present invention;

FIG. 2 is a part diagrammatical, part schematical, part cross-sectional view showing an underground shelter made in accordance with the present invention;

FIG. 6 is a perspective view of another embodiment of the invention;

FIG. 7 is a side elevational view of the underground shelter of FIG. 6; and,

FIG. 8 is a side elevational view of the side opposite of FIG. 7.

DETAILED DESCRIPTION OF THE PREFERRED EMBODIMENT

Figure 3:
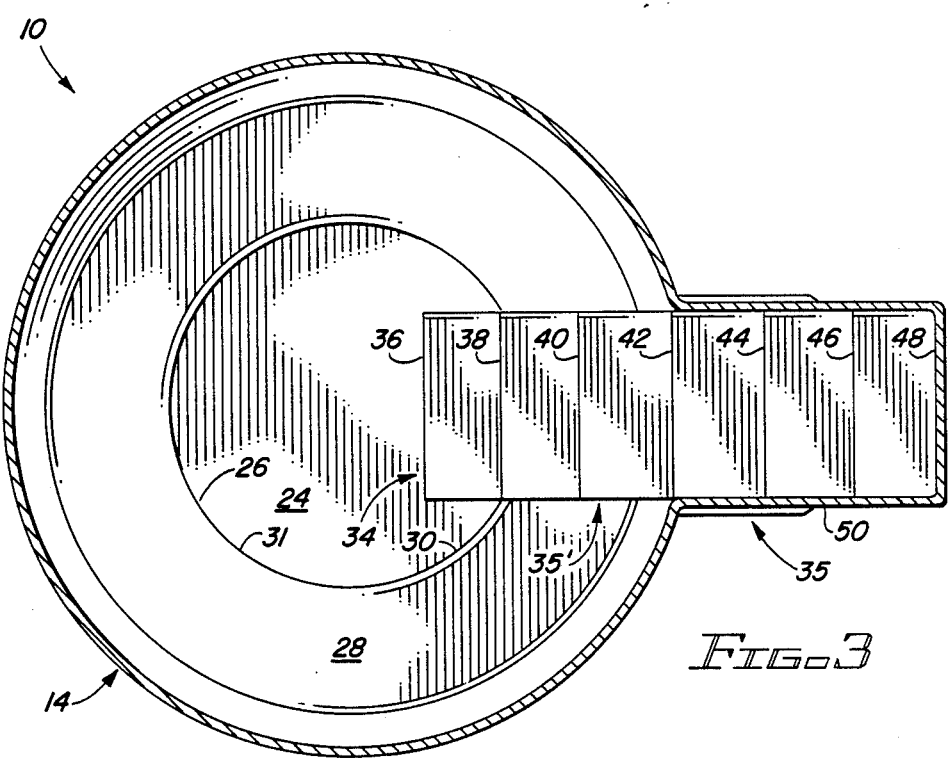
FIG. 3 is a cross-sectional view taken along the equatorial plane of FIG. 1.

In the various figures of the drawings, there is disclosed an underground shelter 10 made of unitary construction in accordance with the present invention. In FIG. 1, the underground shelter 10 is located below the surface of the earth 12. The shelter is a truncated sphere or globe formed from a continuous curved surface 14. In FIG. 2, the globe has a central vertical axis 18 that extends through a curved top surface 20 and a curved bottom surface 16. The bottom surface 16 receives the truncation 22 that results in a floor 24 for supporting persons and things. Equatorial plane 21 divides the upper and lower surfaces 20 and 16.

Figure 4:
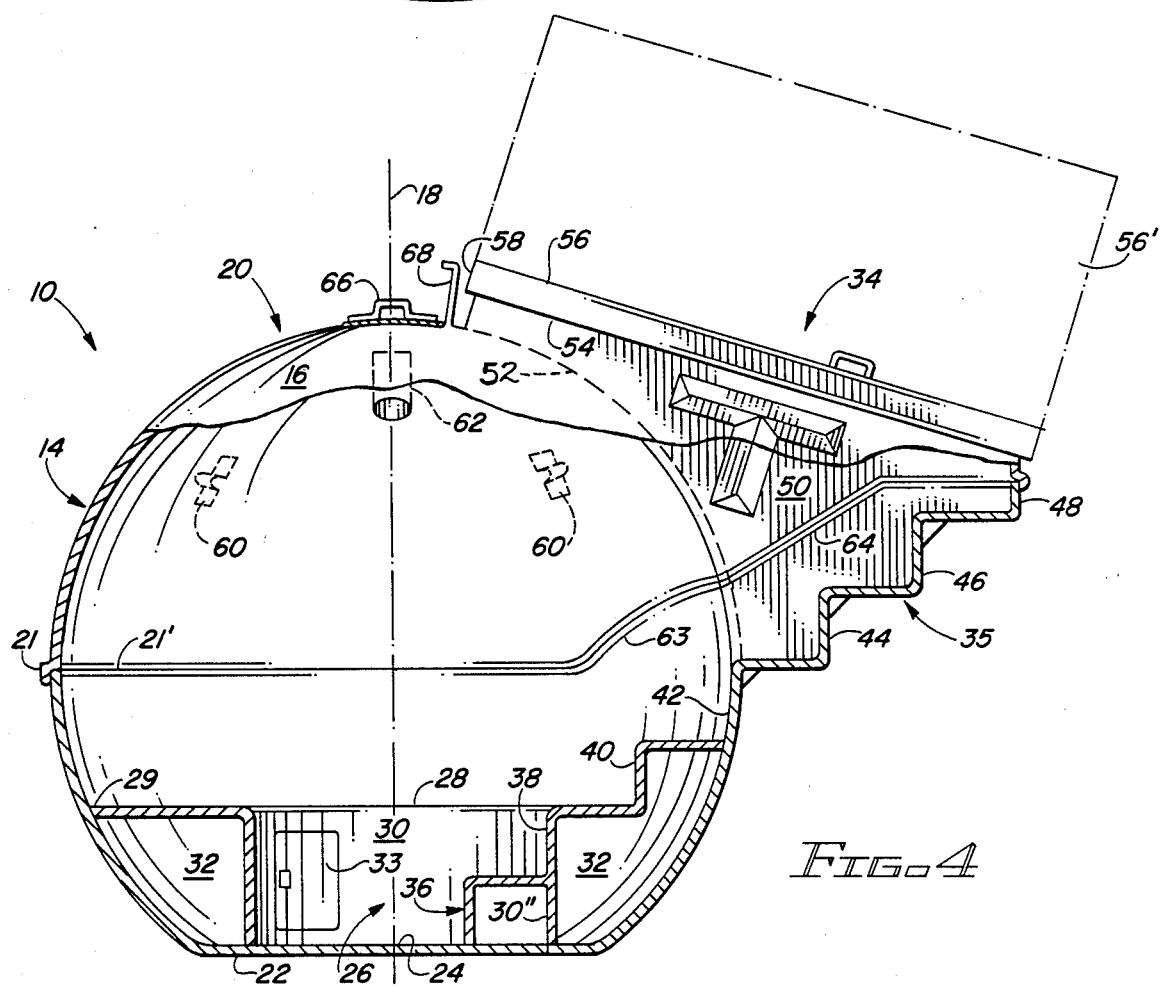
FIG. 4 is a part cross-sectional, side elevational view taken 90 degrees from the illustration set forth in FIG. 3.

In FIGS. 2-4, a seat 26 extends circumferentially about the interior of the shelter and is comprised of a horizontal seating surface 28 attached to said bottom curved surface at 29 and to vertical member 30 attached at 31 to the floor 24. The seat 26 is hollow as indicated by numeral 32 and thereby forms an annular reinforcing member by which the lower extremity of the globe is rigidified. The interior 32 can be used for storage so there is an access door 33 into the interior 32 of the member 26.

In FIGS. 2 and 4, together with other figures of the drawings, an entrance 34 into the shelter provides access to a stairway 35 comprised of a plurality of steps 36-48. Step 36 is the lowest of the plurality of steps while step 48 is the highest of the plurality of steps, with there being steps 38, 40, 42, 44, and 46 therebetween, with the seat assembly 26 forming part of the support structure for one of the steps. The stairway and seat are made integral with the surface 16 and floor 24.

The entrance 34 is a rectangular opening having vertical opposed sidewalls 50 attached to the curved surface of the globe at 52, with the opposed edge 54 thereof lying in a common plane for abuttingly engaging a hinged door 56 The door 56 has an upper end 58 spaced from the vertical axis 18 and extends radially therefrom at a slightly downward angle.

Figure 5:
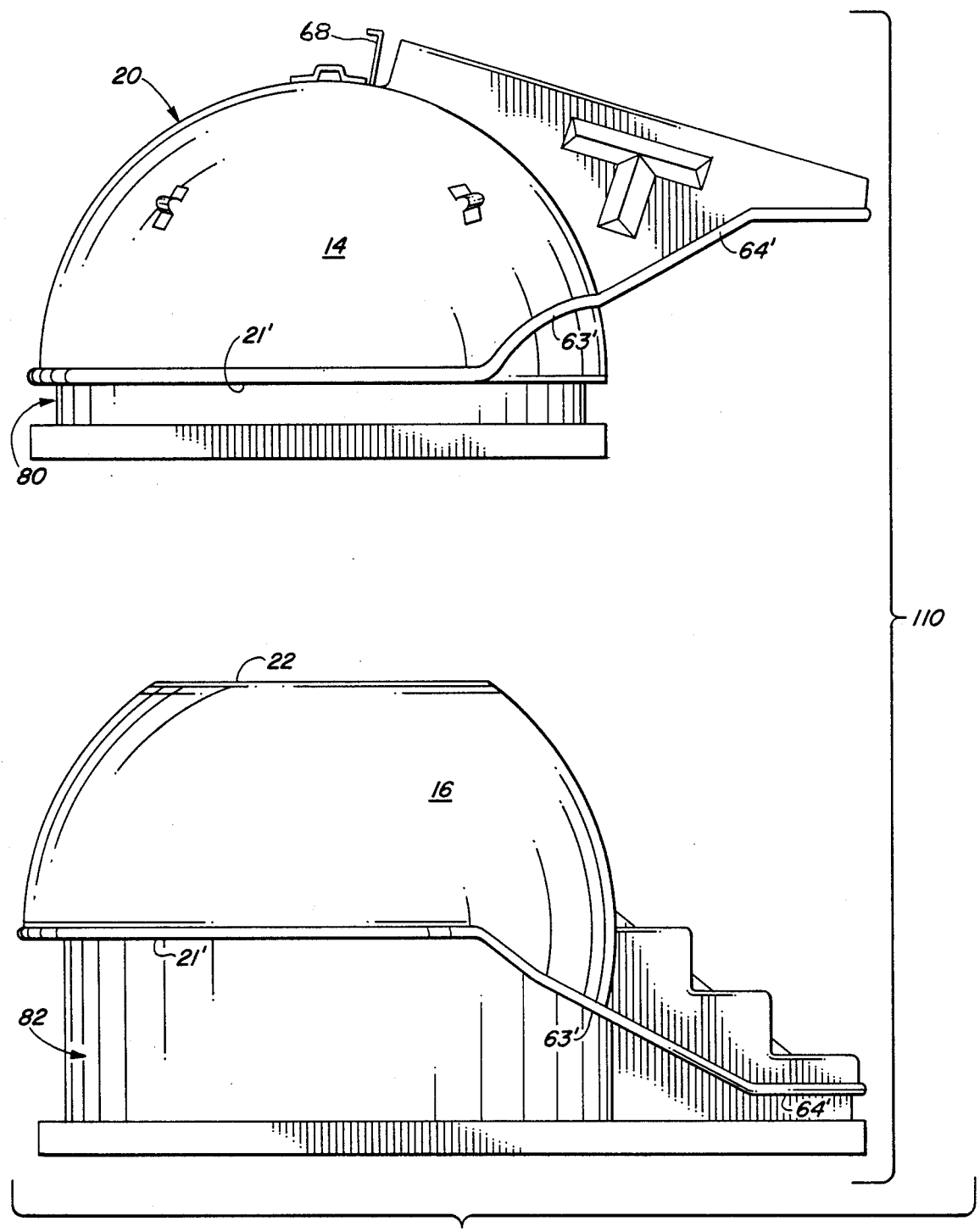
FIG. 5 illustrates the method of fabrication of various different components that provide the completed underground shelter of present invention.

A plurality of anchors have attachment members 60, 60' which are made integral with the surface of the globe for anchoring the shelter within the soil. Vents 62 extend upward from the top surface of the globe. The shelter includes an equatorial seam at 21 which is inclined at 63, and then turns back towards the horizontal at 64, and then continues about the entrance to thereby divide the entrance into an upper and a lower member The upper and lower members are rigidly affixed to one another along the seam 21, 63, and 64. Lifting eye 66 is attached to a reinforced fiberglass patch applied to the apex of the globe. In FIGS. 4 and 5, a shield or baffle member 68 stabilizes the soil and prevents movement of earth onto the upper end 58 of the door 56. Numeral 56' indicates the open door.

The angle at which the door 56 is inclined respective to the horizontal is less than the natural angle of repose of sand and gravel, so that the upper surface of the globe can be back filled with a few inches of soil, and then a few inches of gravel or sand placed thereon, to thereby provide an overburden of about one-half foot of material above the highest point of the shelter. In this manner, the door 34 extends about one inch above the gravel which forms a hill that downwardly slopes from the apex of the storm shelter, leaving the door 56 free of any shifting soil, sand, or gravel.

The floor diameter is at least one-half the diameter of the equatorial plane. In one embodiment of an actual reduction to practice, the equatorial plane diameter is 94 inches, the floor diameter 52 inches, which also is the diameter of the inner seat member 30, and the diameter at the back of the seat (at 29) is 80 inches. The opening for the door is 27×72 inches.

In operation, as seen in FIG. 5, separate male molds or plugs 80 and 82 are constructed for building the top surface 14 and bottom surface 16 of the tornado shelter 10. Fiberglass and resin are employed using standard techniques of building up several plies which are bonded together leaving common seams 21', 63', and 64' on each of the fiberglass halves. The fiberglass halves are removed from the molds and attached to one another along the mating seams 21', 63', 64' using fiberglass resin and cloth, thereby providing a smaller annular reinforcing member about the equatorial plane of the unitary globe 14 of the present invention. This provides a shelter of unitary construction wherein all of the components are made integral respective to one another.

The circumferentially extending seat 26 greatly rigidifies the bottom surface and adds great strength to the globe. The seams 21, 63, and 64 outwardly extend approximately two inches and rigidifies the two semi-spherical members until they can be joined, and therefore imparts strength into the globe and stairway.

The storm shelter is installed by excavating a hole about five feet in depth and nine feet in diameter. The bottom is padded with several inches of gravel and sand. The anchors are placed into the earth as shown after which the formed shelter is lifted by eyelet 66 and lowered into the ground.

Prior to placement of the shelter into the ground four earth anchors 70 are drilled into the sides of the excavation so that cable 72 can subsequently be attached to anchor point 60. The cable 72 preferably extends downwardly 45 degrees from anchor points 60 and tensioned respective to the anchor 70 that extends into the soil. The anchors 70 are spaced radially 90 or 120 degrees apart. Next, the vents 74, 76 are attached to the conduit 62, and then the shelter excavation is back filled to provide a surface 12 that slopes in 360 degrees away from the apex 66 of the globe. Several inches of colorful gravel is applied to the top surface and stepping stones may be added that lead up to the door 56.

In FIGS. 4 and 6, the "T" reinforcement of wall 50 stiffens the sidewalls of the entrance and adds rigidity to the stairway. The reinforcement attached between the vertical and horizontal step members stiffen the steps so that there is little discernable deflection caused by the loads imparted by the average person. The interior of the shelter is white so that it is cheerful and can be well lighted with little energy.

The second embodiment of the invention is set forth in FIGS. 6-8, wherein like or similar numerals refer to like or similar elements. The modified stairway 135 has additional steps added thereto so that the entrance extends about two feet above the entrance of the structure of the first embodiment. This extension of the height of the stairway facilitates incorporation of the structure into the floor of a home. The stairway 135 conveniently extends at 88 up through the floor with the door 56 being disposed above the floor level of a home. This structure also can advantageously be placed under a patio, wherein the stairway safely extends at least three steps above the top surface of the patio, thereby precluding someone inadvertently falling through the open door thereof.

In FIGS. 6-8 there is an uppermost member 88 that is divided from a top member 90 by the inclined seam 86. The uppermost member 88 includes the three uppermost steps and is made separate from the upper surface 90 which is made separate from the bottom surface 92. The additional structure 88 is attached at 86 to the first embodiment of the invention.

The present invention provides an underground shelter having an entrance above ground that is sealed and of unitary structure so that ingress of surface water is avoided. The apparatus is rigidified by a unique annular member that extends circumferentially about the lower half of the shelter and forms a structural member that serves as a seat, a step, and a storage area. The apparatus in anchored within the earth at radially spaced anchor points in a manner that precludes the apparatus from floating to the surface in the event the water table should rise above the floor.

In an eight foot diameter shelter having a seat 13"×13" at 28, 30 and a floor 52 inches in diameter, the location of the seat 26 places the curved interior wall against one's back with unexpected comfort. The 52 inch diameter floor provides ample room for several people to occupy the enclosure and occasionally change position. The annular seat member forces a standing person to be positioned in an area that has a large headroom. The stairway 35 artistically flows into the sidewall and gives the assurance that escape is always possible and consequently, there is reduced probability of claustrophobia. The smooth interior of the shelter and the arrangement of the floor, seat, stairway, and overhead appear massive in construction, and join to complement one another so that a synergistic effect is achieved with the result being a shelter that is pleasing and soothing, and has a tranquil effect on the occupants. The feeling of safety and well being makes some occupants reluctant to leave the structure, possibly because it satisfies an ancient derived from our fore-fathers that dwelled in caves thousands of years ago.

I claim:

1. A generally spherical shelter for safely housing and protecting people and things underground comprising an enclosure in the form of a truncated globe formed from a curved sidewall having a vertical central axis that passes through a top and bottom surface, with there being an equatorial plane passing through the major diameter of the globe at right angles to the central axis, the bottom surface being flat and lying in a horizontal plane that is parallel to the equatorial plane and forms a floor, a seat extends about the interior of said shelter and is attached to the sidewall and to the floor and thereby forms a structural member that rigidifies said globe;

a generally rectangular entrance is formed eccentrically respective to the central axis and has opposed longitudinally extending sides extending radially through the sidewall at a location commencing near the top and extending circumferentially along the sidewall and toward the bottom; a closure member forming a door for said entrance, a plurality of steps leading from said entrance down to said floor by which a person can conveniently walk through the entrance and down the steps into and up the steps from the shelter;

wherein said rectangular entrance is formed from vertical wall members which include said longitudinal extending sides, said vertical wall members having opposed sides that terminate in opposed upper and lower edges, the lower edge is curved into attached relationship respective to said sidewall and the opposed upper edge is spaced from said sidewall to terminate in a member that defines said rectangular entrance and abuttingly receives said closure member thereagainst and thereby defines a doorway into the shelter;

the vent means attached to the top that communicates with ambient by which fresh air can be introduced into the shelter.

2. The shelter of claim 1 wherein there is a baffle member lying above said entrance in spaced relationship to the doorway which protects the doorway from shifting soil and stabilizes the soil against movement.

3. The shelter of claim 2 wherein anchor means is attached to the outer surface of said sidewall at circumferentially spaced locations whereby said anchor means extend radially from said shelter and are fixed into the ground to anchor the shelter with great force within the ground.

4. The shelter of claim 1 wherein said seat has vertical and horizontal wall sections connected together and to the sidewall and floor to form a toroidal enclosure; a port formed into said toroidal enclosure by which access is gained so that a storage area is made available; said seat supports at least one of said steps.

5. A tornado shelter adapted to be buried underground comprising an enclosure in the form of a truncate globe for safely housing and protecting people and things in an enclosure that is formed from a curved sidewall; said shelter has a vertical central axis that passes through a top and bottom surface, said central axis is arranged perpendicular to the equatorial plane that passes through a major diameter, said major diameter divides said shelter into a top part and bottom part;

the truncation of said globe occurs near the bottom thereof to eliminate a significant part of the height of the globe and to form the bottom surface into a floor which is flat and lies in a plane which is horizontal to and spaced from the equatorial plane;

a generally rectangular raised entrance formed through the sidewall at a location commencing at the top part and extending radially from the central axis and circumferentially along the sidewall toward the bottom, a closure member forming a door for said entrance;

said rectangular, raised entrance includes vertical wall members having one edge attached to said sidewall and an opposed edge spaced from said sidewall to terminate in a member that cooperates with said closure member and thereby define a doorway into the shelter;

a plurality of entrance steps leading from said entrance down to said floor by which a person can conveniently walk down into and up from the shelter;

a seat attached to the sidewall and to the floor and forming a structural member the rigidifies the globe, said seat circumferentially extends about the interior of said shelter and supports at least one of a plurality of said entrance steps;

and vent means in the top part that communicates with ambient by which fresh air can be introduced into the shelter.

6. The shelter of claim 5 wherein there is a baffle member lying above said entrance which protects said entrance from shifting soil and stabilizes the soil.

7. The shelter of claim 6 wherein anchor means is attached to the outer surface of said sidewall at circumferentially spaced locations whereby said anchor means extend radially from said shelter and into the ground to anchor the shelter with great force.

8. The shelter of claim 5 and further including an annular structure member in the form of a seat that has vertical and horizontal walls, that together with the sidewall form a toroidal enclosure; a port formed into said toroidal enclosure by which access is gained so that a storage area is formed therewithin.

9. The shelter of claim 8 wherein the doorway lies at an angle respective to the horizontal which is less than the angle of repose of any backfill material that may overburden the shelter so that the shelter, save the doorway and marginal end of the vent, can be buried below the surface of the earth.

10. A generally spherical tornado shelter for safely housing and protecting people and things underground comprising an enclosure in the general form of a truncated globe that is formed from a curved sidewall having a vertical central axis that passes through a top and bottom surface formed by said sidewall, an equatorial plane arranged perpendicular respective to the central axis; the bottom surface being flat and lying in a horizontal plane that is parallel to a plane passing through the equatorial plane of the globe, and forms a floor; a seat attached to the sidewall and to the floor and forming a structural member the rigidifies the globe;

a generally rectangular entrance formed through the sidewall at a location commencing near the top and extending circumferentially along the sidewall toward the equatorial plane of the globe, said entrance is positioned in spaced relation respective to the vertical axis of the globe and extends radially therefrom and is formed by opposed sides arranged perpendicularly respective to the equatorial plane of the globe; a closure member forming a door for said entrance, means forming a plurality of steps within said shelter leading from said entrance down to said floor by which a person can conveniently walk down into and up from the interior of the shelter; said seat circumferentially extends about the interior of said shelter and supports at least one of a plurality of entrance steps;

vent means formed in the top surface that communicates the globe interior with ambient by which fresh air can be introduced into the shelter;

said rectangular entrance includes vertical wall members that terminate in one curved edge attached to a sidewall and an opposed edge that lies in aplane that is spaced from said sidewall to terminate in a member that cooperates with said closure member and thereby defines a doorway into the shelter;

means forming a baffle member positioned in spaced relation to said entrance and to said central axis which protects the doorway from shifting soil and stabilizes the nearby soil; and, anchor means is attached to the outer surface of said sidewall at circumferentially spaced locations whereby said anchor means extend radially from said shelter and into the ground to anchor the shelter with great force.

11. The shelter of claim 10 wherein said seat has vertical and horizontal walls attached together and to the sidewall and floor and thereby forms an annular structural member that defines a toroidal enclosure; an access port formed into said toroidal enclosure by which access is gained thereto so that storage is made available therein.

12. The shelter of claim 1 wherein the doorway downwardly and outwardly slopes from the central axis and lies at an angle which is less than the natural angle of repose of the soil that covers the shelter and forms an obtuse angle respective to the floor so that the shelter, save the doorway, can be buried below the surface.

13. The shelter of claim 12 wherein the shelter component that forms a lowermost part thereof, an uppermost component that forms the uppermost part of said stairway, and an upper surface that is integrally attached to said lower and upper component.

* * * * *

UNITED STATES PATENT AND TRADEMARK OFFICE
CERTIFICATE OF CORRECTION

PATENT NO. : 4,955,166

DATED : September 11, 1990

INVENTOR(S) : Steve M. Oualline & Louis R. Dunnam

It is certified that error appears in the above-identified patent and that said Letters Patent is hereby corrected as shown below:

ON THE TITLE PAGE:

Item [19] "Qualline et al" should read --Oualline et al--.

Item [76] Inventors: "Steve M. Qualline" should read --Steve M. Oualline--.

In the "Abstract", "regidifies" should read --rigidifies-- .
Column 4, line 16, a "." should be inserted after "56", first occurrence.
Column 5, line 55, "ingrees" should read --ingress-- .
Column 7, line 10, "the" should read --an-- .
Column 8, line 52, "claim 1" should read --claim 11-- ;
    Line 58, --comprises a lower-- should be inserted after "shelter", second occurrence .

Signed and Sealed this

Twenty-first Day of January, 1992

*Attest:*

HARRY F. MANBECK, JR.

*Attesting Officer*     *Commissioner of Patents and Trademarks*